(12) United States Patent
Mertes et al.

(10) Patent No.: US 12,187,407 B2
(45) Date of Patent: Jan. 7, 2025

(54) AIRCRAFT INCLUDING A FUSELAGE AND A PANEL REMOVABLY FIXED TO THE FUSELAGE WITH THE AID OF FIXING MEANS

(71) Applicant: Airbus Operations SAS, Toulouse (FR)

(72) Inventors: Anthony Mertes, Toulouse (FR); Patrick Lieven, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 23 days.

(21) Appl. No.: 18/337,139

(22) Filed: Jun. 19, 2023

(65) Prior Publication Data
US 2023/0406476 A1   Dec. 21, 2023

(30) Foreign Application Priority Data

Jun. 21, 2022   (FR) .................................... 2206106

(51) Int. Cl.
*B64C 1/14*   (2006.01)
*B64C 1/12*   (2006.01)

(52) U.S. Cl.
CPC .............. *B64C 1/12* (2013.01); *B64C 1/1446* (2013.01); *B64C 1/1461* (2013.01)

(58) Field of Classification Search
CPC ... B64C 1/1446; B64C 1/1415; B64C 1/1461; B64C 1/14
See application file for complete search history.

(56) References Cited

U.S. PATENT DOCUMENTS

| 1,426,639 | A  | * | 8/1922 | Herrmann | B64C 1/1423 |
| | | | | | 244/119 |
| 11,338,900 | B2 | * | 5/2022 | Curry | B64C 1/1461 |
| 2015/0090840 | A1 | * | 4/2015 | Jespersen | B64C 1/1415 |
| | | | | | 244/129.5 |

FOREIGN PATENT DOCUMENTS

| CN | 106672200 A | 5/2017 |
| CN | 109551830 A | 4/2019 |
| FR | 3089947 A1 | 6/2020 |

OTHER PUBLICATIONS

French Search Report for corresponding French Patent Application No. 2206106 dated Jan. 31, 2023; priority document.

* cited by examiner

*Primary Examiner* — Richard Green
(74) *Attorney, Agent, or Firm* — Greer, Burns & Crain, Ltd.

(57) ABSTRACT

An aircraft including a fuselage including an opening and beams that are aligned and that are interrupted at the edges of the opening, a removable panel where for each pair of aligned beams of the fuselage interrupted at the opening a beam of the removable panel extends between the two beams of the pair and each end of the beam of the removable panel faces an end of a beam of the pair and at the end of at least one beam of the fuselage facing an end of a beam of the removable panel, fixing means providing a removable fixing between the ends.

8 Claims, 7 Drawing Sheets

AIRCRAFT INCLUDING A FUSELAGE AND A PANEL REMOVABLY FIXED TO THE FUSELAGE WITH THE AID OF FIXING MEANS

CROSS-REFERENCES TO RELATED APPLICATIONS

This application claims the benefit of French Patent Application No. 2 206 106 filed on Jun. 21, 2022, the entire disclosure of which is incorporated herein by way of reference.

FIELD OF THE INVENTION

The present invention concerns an aircraft including a fuselage and a panel removably fixed to the fuselage with the aid of particular fixing means. The invention also concerns a method of assembling the removable panel onto the fuselage.

BACKGROUND OF THE INVENTION

At present, to store kerosene an aircraft includes tanks that are classically housed in the wings. To limit pollution changing fuel is being envisaged so as to use liquid or gas dihydrogen. To store the dihydrogen it is intended to use tanks that are accommodated in the fuselage of the aircraft.

To carry out maintenance of these tanks it is necessary to be able to access them easily and possibly to remove them if required. It is therefore necessary to provide a removable panel that is easy to fit and to remove and that also assures the structural continuity of the fuselage.

SUMMARY OF THE INVENTION

An object of the invention is therefore to provide an aircraft including a fuselage and at least one panel removably fixed to the fuselage with the aid of particular fixing means that provide easy mounting and demounting of the panel as well as structural continuity of the fuselage.

To this end there is proposed an aircraft including:

With an arrangement of this kind mounting and demounting the removable panel are facilitated.

The receptacle is advantageously open toward the exterior of the aircraft.

The opening is advantageously delimited by longerons of the fuselage and in that each longeron of the fuselage is fixed between the ends of the beams of the fuselage and the shoes of the female fittings.

The removable panel is advantageously delimited by longerons and in that each longeron of the removable panel is fixed between the ends of the beams of the removable panel and the shoes of the male fittings.

The aircraft advantageously includes cover strips removably fixed along the edges of the opening outside the fixing means.

The adjustment system advantageously includes:

a screw the externally threaded shank of which is screwed into the female fitting and the head of which carries the bearing surface and where the periphery of the head of the screw includes an imprint, an immobilizing plate mobile in translation parallel to a translation direction, where the immobilizing plate comprises a first flat with a hollow counter-imprint that receives the head and the imprint and that cooperates with said imprint to immobilize the screw in rotation and a second flat with two oblong holes the axes of which are parallel to the translation direction, and for each oblong hole a clamping screw that is screwed into the female fitting, sandwiching the second flat.

Advantageously, the adjustment system includes shims between the head of the screw and the lateral surface.

The invention also proposes a method of assembling a removable panel onto a fuselage of an aircraft conforming to any one of the above embodiments, the method including:

an offering up step during which the removable panel equipped with the male fittings is offered up to the fuselage equipped with the female fittings, a pre-fixing step during which, for each pair comprising a male fitting and a female fitting, the bolt is screwed in but not tightened in order to provide a slack fixing, a bearing step during which, for each bearing surface, the corresponding adjustment system is actuated to place said bearing surface against the corresponding lateral surface of the male element and to immobilize said bearing surface in this position, and a tightening step during which each bolt is tightened down.

BRIEF DESCRIPTION OF THE DRAWINGS

The features of the invention referred to hereinabove and others will become more clearly apparent on reading the following description of one embodiment, said description being given with reference to the appended drawings, in which.

DETAILED DESCRIPTION OF THE PREFERRED EMBODIMENTS

Figure 1:
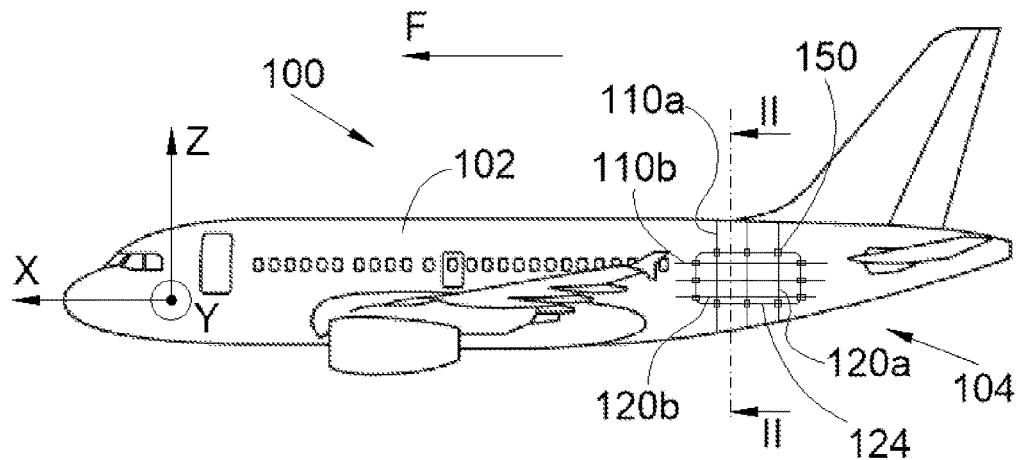
FIG. 1 is a side view of an aircraft according to the invention.

FIG. 1 shows an aircraft 100 that includes a fuselage 102 of cylindrical overall shape and a removable panel 104 removably fixed to the fuselage 102. In the embodiment of the invention shown in FIG. 1 there is only one removable panel 104 but it is possible to have several of them.

Figure 2:
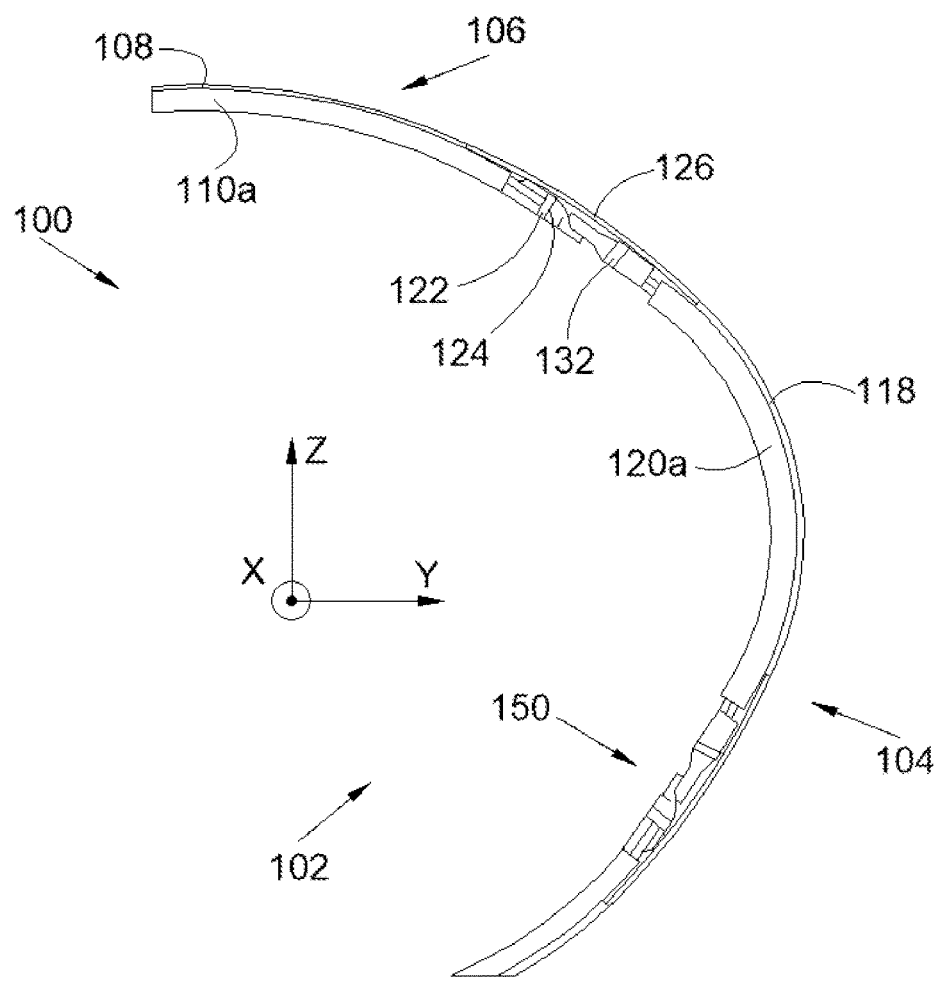
FIG. 2 is a view in section of the fuselage of the aircraft taken on the line II-II in FIG. 1.

FIG. 2 shows a section of the aircraft 100. The fuselage 102 includes an opening 124 that here is of rectangular general shape and is blocked by the removable panel 104 when the latter is in place.

In the following description and by convention X denotes the longitudinal direction of the aircraft 100, Y denotes the transverse direction that is horizontal when the aircraft 100 is on the ground, and Z denotes the vertical direction which is vertical when the aircraft 100 is on the ground, these three directions X, Y and Z being mutually orthogonal.

In the following description terms relating to a position refer to an aircraft 100 in the normal flight position, that is to say as represented in FIG. 1, and "front" and "rear" positions are taken as being relative to the front and the rear of the aircraft 100 with reference to its direction of forward movement when its engines are operating. The arrow F represents the direction of forward movement of the aircraft 100 in flight.

The fuselage 102 is made up of panels 106 which are generally of arcuate shape about a longitudinal axis X and each panel 106 comprises a skin 108 and beams 110*a-b* fixed to the interior face of the skin 108. In the embodiment of the invention shown in FIG. 1 there are first beams 110*a* each arranged in a vertical plane parallel to the plane YZ and second beams 110*b* each extending in the longitudinal direction X.

Each beam 110*a-b* of the fuselage 102 is interrupted at one of its ends at an edge of the opening 124.

For each first beam 110*a* that is interrupted at an edge of the opening 124 another first beam 110*a* is aligned with, that is to say in the same vertical plane as, said first beam 110*a* and is interrupted at the opposite edge of the opening 124.

Similarly, for each second beam 110*b* that is interrupted at an edge of the opening 124 another second beam 110*b* is aligned longitudinally with said second beam 110*b* and is interrupted at the opposite edge of the opening 124.

The removable panel 104 includes a skin 118 and beams 120*a-b* fixed to an interior face of the skin 118 of the removable panel 104.

For each pair of aligned beams 110*a-b* of the fuselage 102 interrupted at the opening 124 the removable panel 104 includes a beam 120*a-b* that extends between beams 110*a-b* of the pair. Thus there is a first beam 120*a* of the removable panel 104 that extends between two first beams 110*a* of the fuselage 102 and a second beam 120*b* of the removable panel 104 that extends between two second beams 110*b* of the fuselage 102. Each end of the beam 120*a-b* of the removable panel 104 faces one end of a beam 110*a-b* of the pair.

At the end of a beam 110*a-b* of the fuselage 102 facing an end of a beam 120*a-b* of the removable panel 104 the aircraft 100 includes fixing means 150 that provide a removable fixing between the end of said beam 110*a-b* of the fuselage 102 and the end of said beam 120*a-b* of the removable panel 104. The fixing means 150 are not necessarily positioned at the end of each beam 110*a-b* of the fuselage 102 but rather at the end of at least one beam 110*a-b* of the fuselage 102 and, as a function of structural strength, other fixing means 150 are fitted to the ends of other beams 110*a-b* of the fuselage 102. In the embodiment of the invention shown in FIG. 1 there are fixing means 150 at each end of a beam 110*a-b* of the fuselage 102 facing an end of a beam 120*a-b* of the removable panel 104.

In the embodiment of the invention shown here the opening 124 is delimited horizontally by longerons 122 of the fuselage 102 that extend longitudinally. Here there is a longeron 122 in the upper part of the opening 124 and a longeron in the lower part of the opening 124. Similarly, the opening 124 is delimited vertically by stiffeners of the fuselage 102 that extend vertically and there is therefore a stiffener in the front part of the opening 124 and a stiffener in the rear part of the opening 124. The longerons 122 of the fuselage 102 are fixed to the interior face of the skin 108 of the fuselage 102.

Similarly, here the removable panel 104 is delimited by longerons 132 that extend longitudinally at the top and at the bottom of the removable panel 104 and longerons that extend vertically in the front part and in the rear part of the removable panel 104. The longerons 132 of the removable panel 104 are fixed to the interior face of the skin 118 of the removable panel 104.

In the embodiment of the invention shown here the end of each beam 110*a-b*, 120*a-b* is fixed to a longeron 122, 132 by means of fixing means 150 as explained hereinafter.

An arrangement of this kind therefore assures fixing of the removable panel 104 and locking and unlocking of the fixing means 150 enabling the removable panel 104 to be fixed and released. It is therefore easy to remove the removable panel 104 to obtain access to the interior of the fuselage 102, for example to carry out maintenance on a dihydrogen tank, but also for all other maintenance operations.

To hide the fixing means 150 the aircraft 100 includes cover strips 126 that are fixed along the edges of the opening 124. The cover strips 126 are removably fixed by any appropriate means such as screws for example. Removing the cover strips 126 enables access to the fixing means 150 for fixing them or releasing them. The cover strips 126 are fixed to the exterior of the fixing means 150 to hide them.

Figure 3:
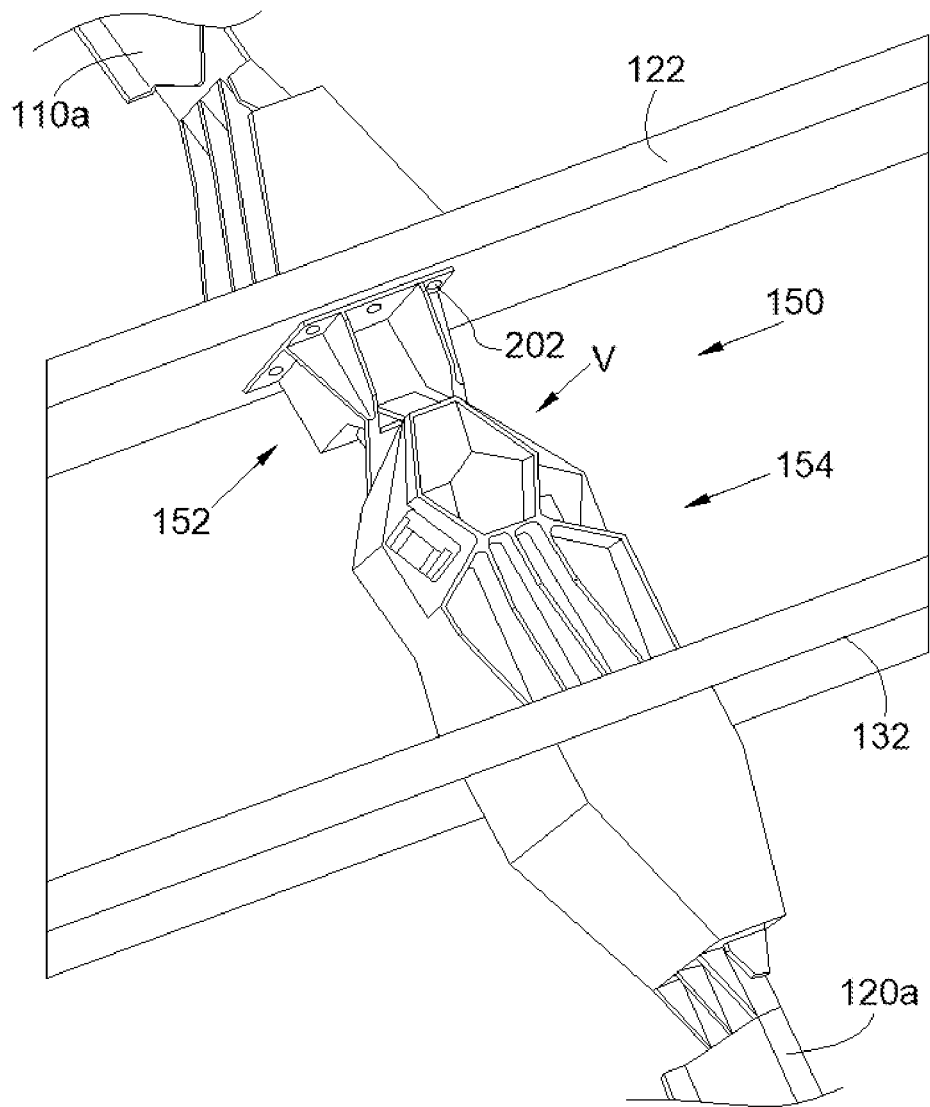
FIG. 3 is a perspective view of the fixing means according to the invention.

FIG. 3 shows the fixing means 150 that are fixed between a first beam 110*a* of the fuselage 102 and a first beam 120*a* of the removable panel 104 through the longerons 122 and 132 of the fuselage 102 and of the removable panel 104. The fixing means 150 include a female fitting 152 and male fitting 154. The following description is more particularly applied to the first beams 110*a* and 120*a* but applies in the same manner to the second beams 110*b* and 120*b*.

The female fitting 152 is fastened to the end of the first beam 110*a* of the fuselage 102 and the male fitting 154 is fastened to the end of the first beam 120*a* of the removable panel 104.

Here fixing is effected by bolts 202. There are therefore bolts 202 that pass through the longerons 122 of the fuselage 102 and sandwich an end of the first beam 110*a* of the fuselage 102 and the female fitting 152 and bolts 202 (seen in FIG. 5) that pass through the longeron 132 of the removable panel 104 and sandwich an end of the first beam 120*a* of the removable panel 104 and the male fitting 154.

Figure 5:
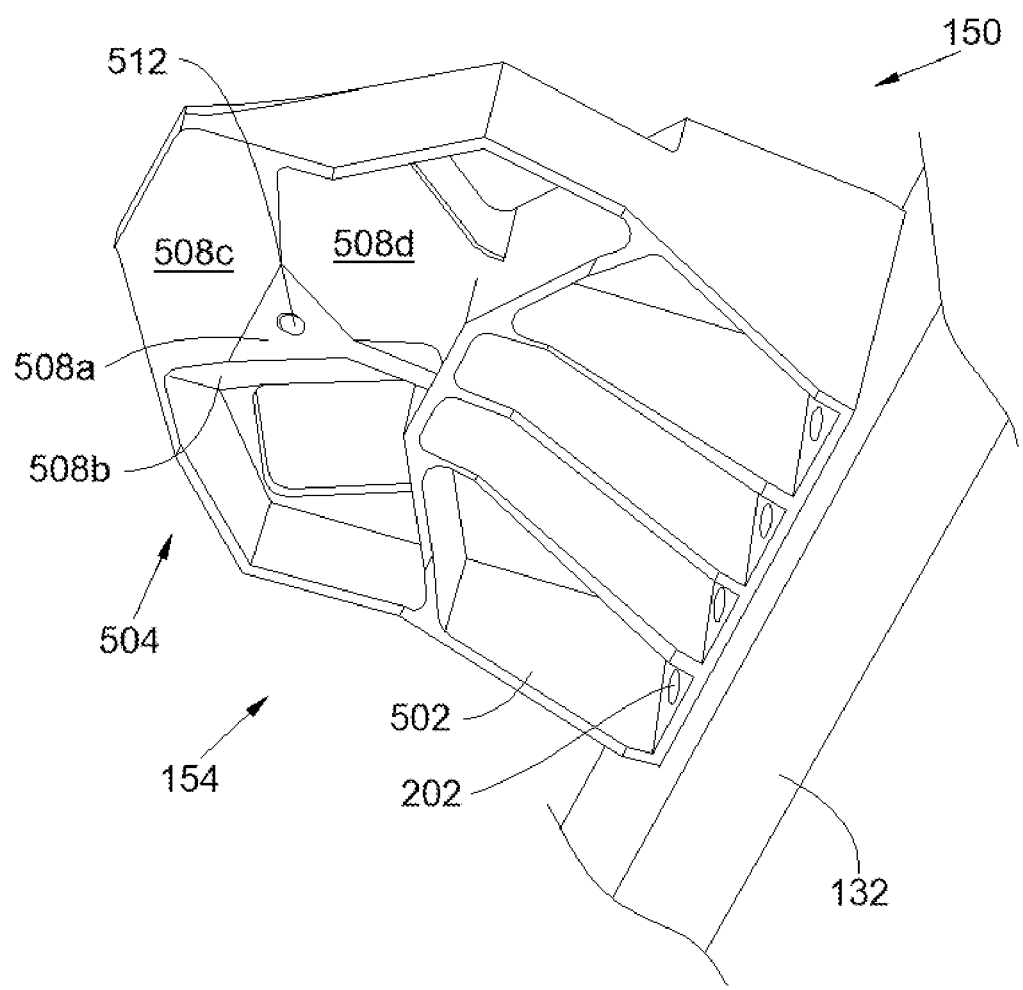
FIG. 5 is a perspective view of a male fitting of the fixing means from FIG. 3.

FIG. 5 shows the male fitting 154 that includes a shoe 502 here fixed to the longeron 132 of the removable panel 104 but more generally to the end of the first beam 120*a* of the removable panel 104. Here the longeron 132 of the removable panel 104 is fixed between the ends of the beams 120*a* of the removable panel 104 and the shoes 502 of the male fittings 154.

The male fitting 154 also includes a male element 504 fastened to the shoe 502 of the male fitting 154 that is inserted in a receptacle (404, FIG. 4) of the female fitting 152.

The male element 504 includes a base surface 508*a* that here is globally tangential to the shape of the fuselage 102.

The male element 504 also includes three lateral surfaces 508*b-d* that all extend from the base surface 508*a* in the same direction toward the exterior of the fuselage 102 relative to the base surface 508*a* in order to create a male element 504 delimited by said three lateral surfaces 508*b-d*.

The three lateral surfaces 508*b-d* are oriented in different planes to immobilize the male fitting 154 in three different directions, as explained hereinafter.

Figure 4:
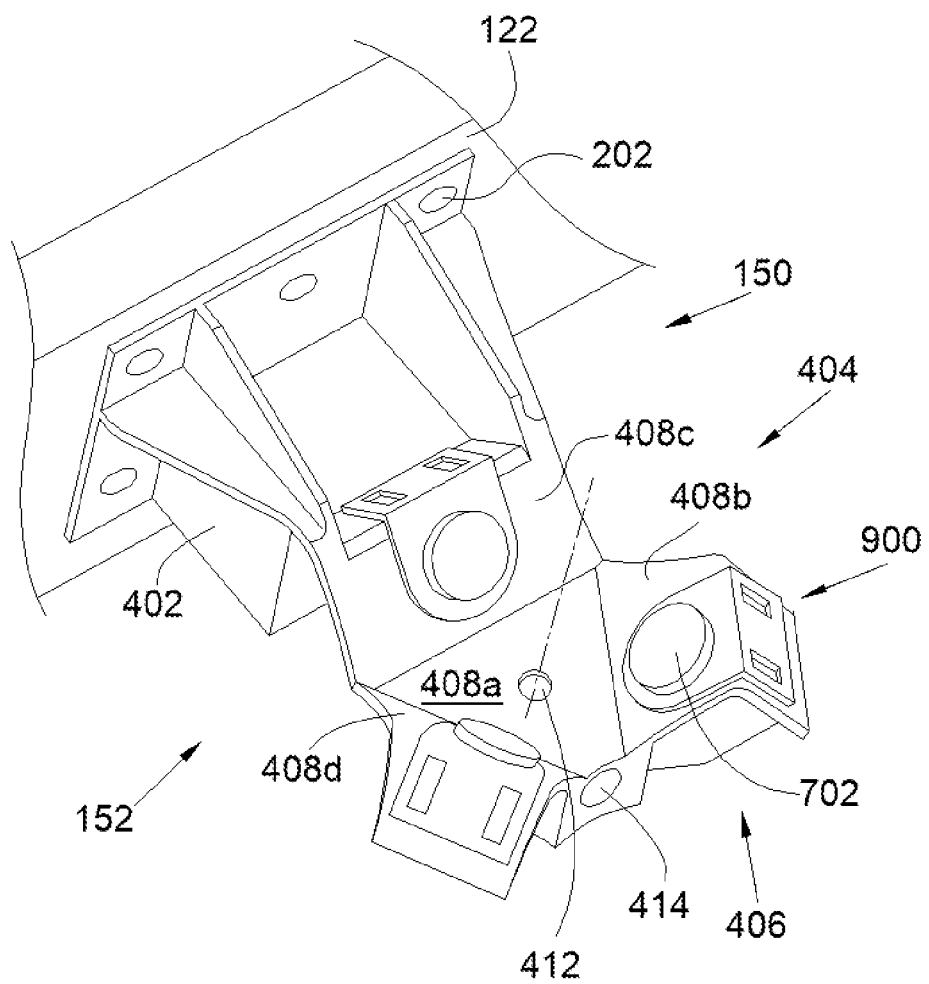
FIG. 4 is a perspective view of a female fitting of the fixing means from FIG. 3.

In the embodiment of the invention shown in FIG. 5 the base surface 508a and each lateral surface 508b-d form a triangle and the male element 504 takes the form a tetrahedron. Each lateral surface 508b-d extends from one of the edges of the base surface 508a. FIG. 4 shows the female fitting 152 which includes a shoe 402 here fixed to the longeron 122 of the fuselage 102 by the bolts 202 but more generally to the end of the first beam 110a of the fuselage 102, and a receptacle 404 fastened to the shoe 402 of the female fitting 152 in which the male element 504 of the male fitting 154 is accommodated. The longeron 122 of the fuselage 102 is therefore fixed between the ends of the beams 110a of the fuselage 102 and the shoes 402 of the female fittings 152.

The receptacle 404 has a base surface 408a and for each lateral surface 508b-d of the male element 504 a lateral surface 408b-d that faces said lateral surface 508b-d of the male element 504 when mounted. The two base surfaces 408a and 508a come to bear against one another when mounted. The receptacle 404 is open towards the exterior of the aircraft 100. The introduction of the male element 504 into the receptacle 404 is therefore simply effected by offering up the removable panel 104 from the exterior.

In the embodiment of the invention shown in FIG. 4 the base surface 408a and each lateral surface 408b-d form a triangle and the receptacle 404 takes the form of a hollow tetrahedron. Each lateral surface 408b-d extends from one of the edges of the base surface 408a.

For each lateral surface 508b-d of the male element 504 the fixing means 150 also include a bearing system 406 that is fastened to the lateral surface 408b-d of the receptacle 404 corresponding to the lateral surface 508b-d of the male element 504 that is adapted to come to bear against said lateral surface 508b-d of the male element 504.

Figure 6:
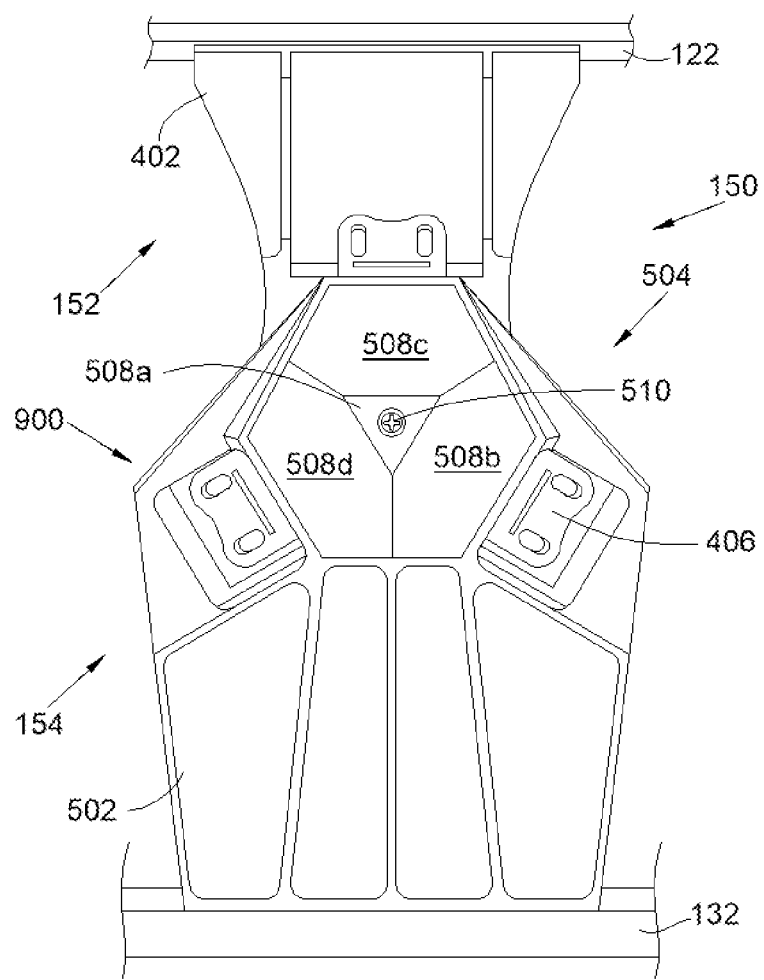
FIG. 6 is a view of the fixing means in the direction of the arrow V in FIG. 3.

FIG. 6 shows the male fitting 154 arranged in the female fitting 152.

The fixing means 150 also include a bolt 510 that includes an externally threaded shank and a nut that is fastened to the female fitting 152 and the threaded shank is screwed into the nut through the male fitting 154. To this end the base surface 508a of the male element 504 includes a first bore 512 and the base surface 408a of the receptacle 404 includes a second bore 412 under which a nut is fixed. The axis of the bolt 510 and therefore of the bores 412, 512 is perpendicular to the base surfaces 408a and 508a. Once screwed down the bolt 510 sandwiches the two base surfaces 408a and 508a.

In the embodiment of the invention shown here the nut is a sleeve nut that is accommodated in a bore 414 produced under the receptacle 404 and into which the second bore 412 opens.

Figure 7:
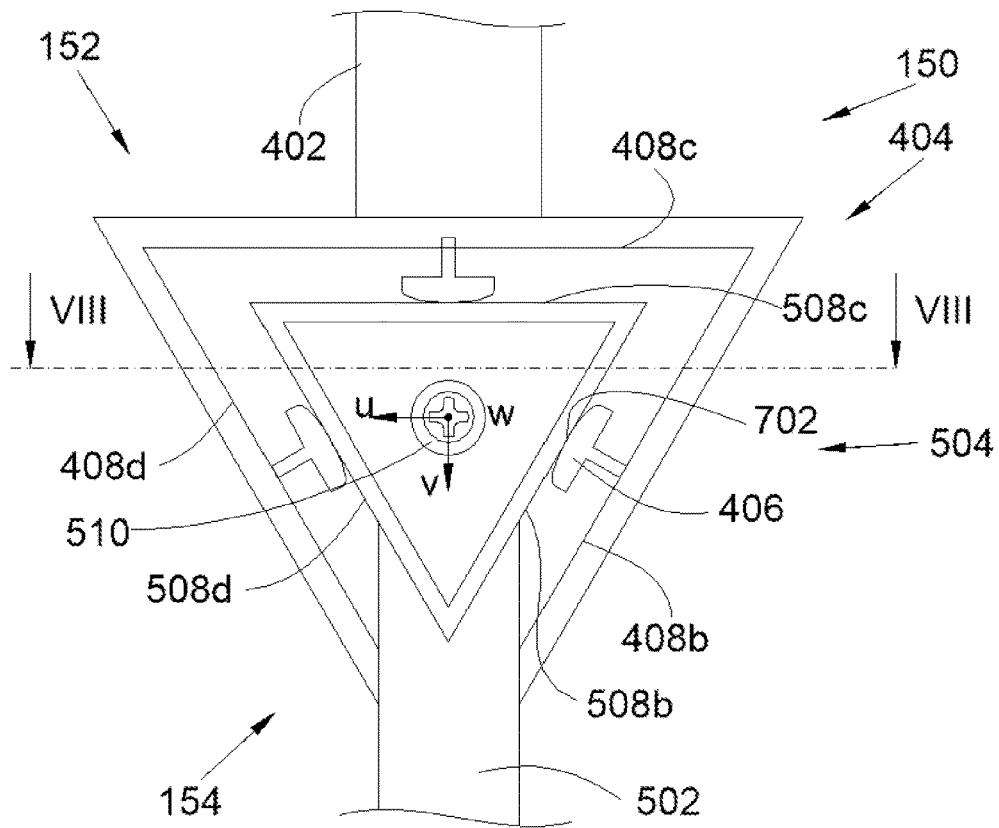
FIG. 7 is a schematic representation of the fixing means according to the invention as seen in the direction of the arrow V in FIG. 3.
Figure 8:
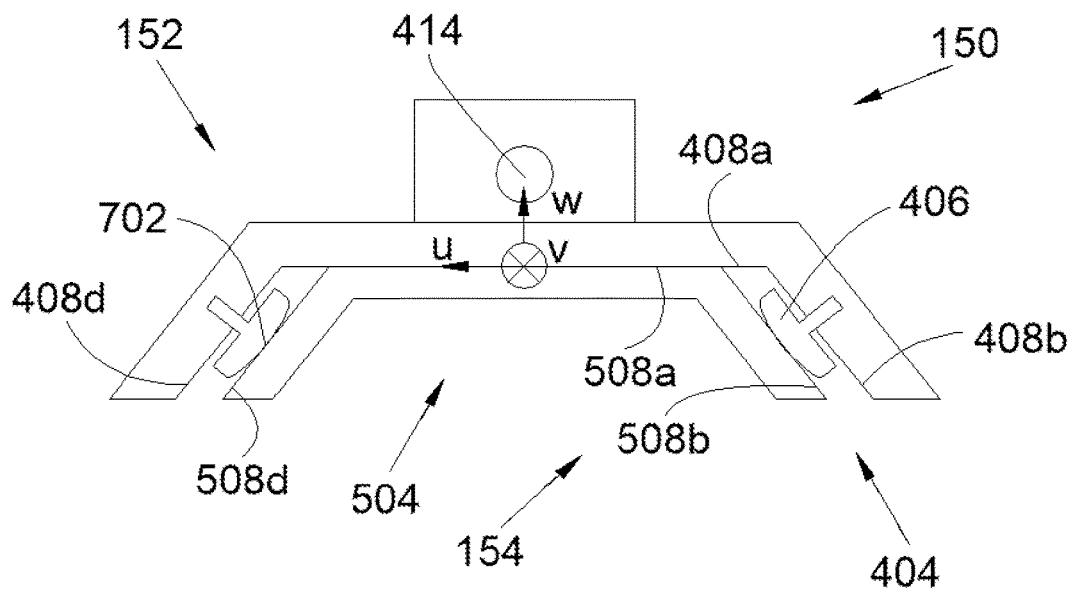
FIG. 8 is a schematic representation of the fixing means according to the invention as seen in section taken on the line VIII-VIII in FIG. 7.

FIG. 7 and FIG. 8 show schematically the fitting of the male fitting 154 in the female fitting 152. In FIG. 8 the two base surfaces 408a and 508a bear against one another.

Each bearing system 406 includes a bearing surface 702 that is adjusted in such a manner as to come to bear against the corresponding lateral surface 508b-d of the male element 504. As FIG. 7 shows, the three bearing surfaces 702 are distributed over the perimeter of the male element 504 and because of the different orientations of the three lateral surfaces 508b-d of the male element 504 the three bearing surfaces 702 immobilize the male element 504.

Accordingly, in a three-dimensional system of axes (u, v, w) linked to the fixing means 150 the contact between the two base surfaces 408a and 508a and the bolt 510 immobilizes movement in translation in direction w and rotation about v and u, and the contacts between the three bearing surfaces 702 and the three lateral surfaces 508b-d of the male element 504 immobilize translation in directions u and v and rotation about w. Thus all degrees of freedom are immobilized and loads pass between the structure of the fuselage 102 and the structure of the removable panel 104 and vice versa.

Figure 9:
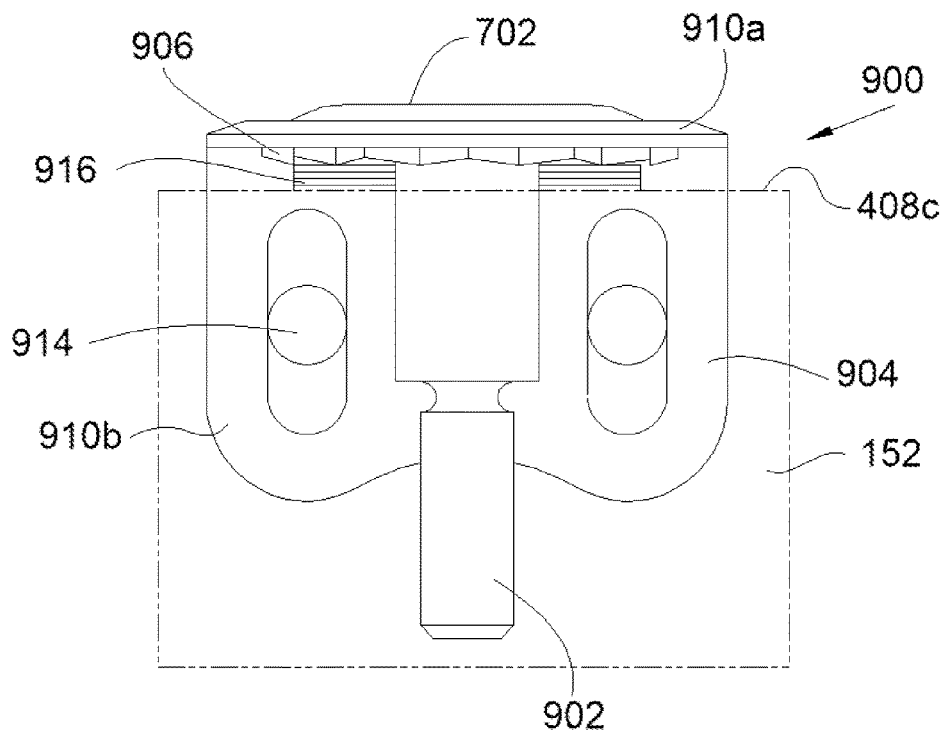
FIG. 9 is a side view of an adjustment system in accordance with one particular embodiment.
Figure 10:
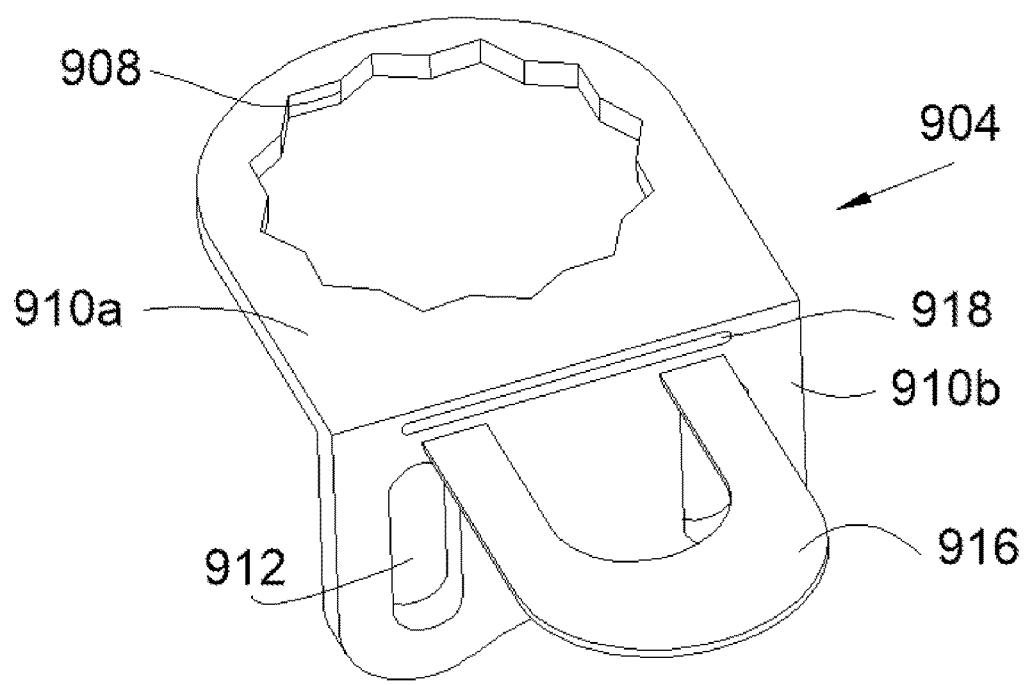
FIG. 10 is a perspective view of a component of the adjustment system from FIG. 9.

To adapt the position of each bearing surface 702 as a function of dimensional and positioning variations of the male element 504 each bearing system 406 includes an adjustment system 900 one embodiment of which is represented in FIGS. 9 and 10 that provides the movement of said bearing surface 702 and its immobilization in position. Accordingly, if required, the bearing surface 702 is moved so as to come to bear against the lateral surface 508b-d of the male element 504 and is thereafter immobilized to remain in that position.

In FIG. 9 the adjustment system 900 is that employed on the female fitting 152 at the lateral surface 408c. Here the female fitting 152 is represented in chain-dotted line but an identical adjustment system is employed for the other lateral surfaces 408b and 408d.

The adjustment system 900 includes a screw 902 the externally threaded shank of which is screwed into the female fitting 152, within the thickness of the lateral surface 408c, and the head of which carries the bearing surface 702. Accordingly, by screwing the screw 902 in or out the bearing surface 702 is brought against the lateral surface 508c of the male element 504. The periphery of the head of the screw 902 includes an imprint 906, here teeth that extend radially around the bearing surface 702. The axis of the screw 902 is perpendicular to the lateral surface 508c of the male element 504.

The adjustment system 900 also includes an immobilizing plate 904 that is represented in perspective in FIG. 10 and here comprises two flats 910a-b. The first flat 910a includes a hollow counter-imprint 908 that receives the head and the imprint 906 and cooperates with said imprint 906 to immobilize the screw 902 in rotation. The counter-imprint 908 here includes teeth that extend radially and cooperate with the teeth of the imprint 906.

The immobilizing plate 904 is mounted to be mobile in translation on the female fitting 152 parallel to a translation direction that here is parallel to the axis of the screw 902. To this end the second flat 910b includes two oblong holes 912 the axes of which are parallel to the translation direction and the adjustment system 900 includes for each oblong hole 912 a clamping screw 914 that is screwed into the female fitting 152 sandwiching the second flat 910b.

The adjustment system 900 preferably includes shims 916 that slide and are clamped between the head of the screw 902 and the lateral surface 408c to bring the head of the screw 902 and the fitting 152 into contact in order to transfer forces by contact and not by way of the external thread of the screw 902. There may be at least one shim 916 or a plurality of them with the same thickness or different thicknesses.

A method of assembling the removable panel 104 onto the fuselage 102 consists in:
  an offering up step during which the removable panel 104 equipped with the male fittings 154 is offered up to the fuselage 102 equipped with the female fittings 152,
  a pre-fixing step during which, for each pair comprising a male fitting 154 and a female fitting 152, the bolt 510 is screwed in but not tightened in order to provide a slack fixing,
  a bearing step during which, for each bearing surface 702, the corresponding adjustment system 900 is actuated to place said bearing surface 702 against the corresponding lateral surface 508b-d of the male element 504 and to immobilize said bearing surface 702 in this position, and a tightening step during which each bolt 510 is tightened down.

In the embodiment of the adjustment system 900 shown in FIGS. 9 and 10 the bearing step consists in:

loosening the clamping screws 914 to free movement in translation of the immobilizing plate 904 parallel to the translation direction, disengaging the imprint 906 and the counter-imprint 908 in such a manner as to free rotation of the screw 902, this disengagement being effected by movement of the immobilizing plate 904 toward the lateral surface 408c, adjusting (screwing in/out) the screw 902 to bring the bearing surface 702 up against the lateral surface 508c of the male element 504, moving the immobilizing plate 904 in translation away from the lateral surface 408c in such a manner as to cause the counter-imprint 908 to cooperate with the imprint 906 and thereby to immobilize rotation of the screw 902, if necessary, sliding the shims 916 against the head of the screw 902 and the lateral surface 408c to fill the gap, and tightening the clamping screws 914 to immobilize the immobilizing plate 904 in translation.

In the embodiment of the invention shown in FIG. 10 the shims 916 are inserted through a slot 918 perpendicular to the axis of the screw 902 that the second flat 910b includes for this purpose. The shims 916 are preferably U-shaped so they can be threaded onto the externally threaded shank of the screw 902 on either side.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
a fuselage including an opening and comprising a skin and beams fixed to an interior face of the skin, wherein each beam is interrupted at one end at an edge of the opening, and wherein for each beam that is interrupted at the edge of the opening another beam is aligned with said beam and interrupted at an opposite edge of the opening forming a pair of aligned beams,
a removable panel including a skin and beams fixed to an interior face of the skin, wherein for each pair of aligned beams of the fuselage a beam of the removable panel extends between the two beams of the pair and each end of the beam of the removable panel faces an end of a beam of the pair, and
fixing means for removably fixing the end of said beam of the fuselage and the end of said beam of the removable panel, said fixing means provided at the end of at least one beam of the fuselage facing an end of a beam of the removable panel, wherein the fixing means include:
a male fitting that includes a shoe fixed to the end of the beam of the removable panel and a male element fastened to the shoe that includes a base surface and three lateral surfaces that all extend from the base surface in the same direction and in different planes,
a female fitting that includes a shoe fixed to the end of the beam of the fuselage and a receptacle fastened to the shoe and in which the male element is accommodated and that includes a base surface bearing against the base surface of the male fittings and for each lateral surface of the male element a lateral surface faces said lateral surface of the male element,
a bearing system, for each lateral surface of the male element, fastened to the lateral surface of the receptacle corresponding to the lateral surface of the male element, wherein the bearing system includes a bearing surface and an adjustment system configured to move said bearing surface and to immobilize it in position, and
a bolt that includes an externally threaded shank and a nut fastened to the female fitting, wherein each base surface includes a bore for the passage of the externally threaded shank and where the bolt sandwiches the two base surfaces.

2. The aircraft according to claim 1, wherein the receptacle is open toward the exterior of the aircraft.

3. The aircraft according to claim 1, wherein in that the opening is delimited by longerons of the fuselage and in that each longeron of the fuselage is fixed between the ends of the beams of the fuselage and the shoes of the female fittings.

4. The aircraft according to claim 1, wherein the removable panel is delimited by longerons and in that each longeron of the removable panel is fixed between the ends of the beams of the removable panel and the shoes of the male fittings.

5. The aircraft according to claim 1, further comprising:
cover strips removably fixed along the edges of the opening outside the fixing means.

6. The aircraft according to claim 1, wherein the adjustment system includes:
a screw the externally threaded shank of which is screwed into the female fitting and the head of which carries the bearing surface and where a periphery of the head of the screw includes an imprint,
an immobilizing plate mobile in translation parallel to a translation direction, where the immobilizing plate comprises a first flat with a hollow counter-imprint that receives the head and the imprint and that cooperates with said imprint to immobilize the screw in rotation and a second flat with two oblong holes the axes of which are parallel to the translation direction, and
for each oblong hole a clamping screw that is screwed into the female fitting, sandwiching the second flat.

7. The aircraft according to claim 6, wherein the adjustment system includes shims between the head of the screw and the lateral surface.

8. A method of assembling the aircraft according to claim 1, the method comprising:
offering up the removable panel equipped with the male fittings to the fuselage equipped with the female fittings,
for each pair comprising a male fitting and a female fitting, screwing but not tightening the bolt in order to provide a slack fixing, for each bearing surface, actuating the corresponding adjustment system to place said bearing surface against the corresponding lateral surface of the male element and to immobilize said bearing surface in this position, and tightening each bolt.

\* \* \* \* \*